I. MORI.
RAZOR.
APPLICATION FILED OCT. 20, 1917.
1,310,086.
Patented July 15, 1919
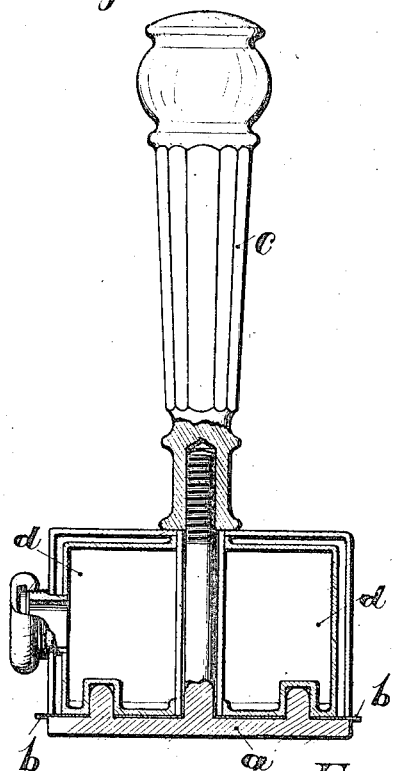
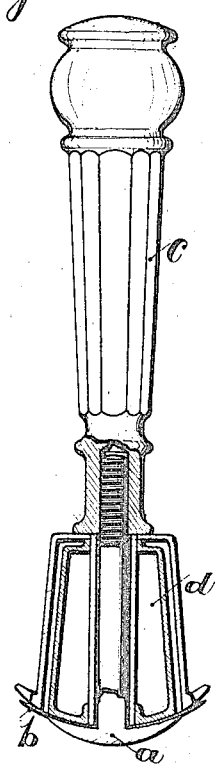
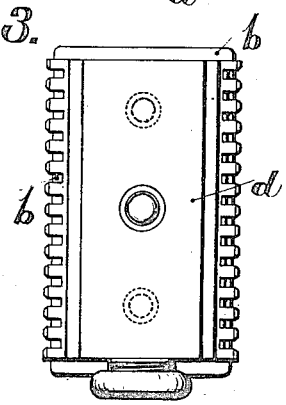
Inventor.
Iguma Mori
By M. C. Massie
his Attorney.

UNITED STATES PATENT OFFICE.

IGUMA MORI, OF NISHINARI-GUN, OSAKA-FU, JAPAN.

RAZOR.

1,310,086.　　　Specification of Letters Patent.　Patented July 15, 1919.

Application filed October 20, 1917. Serial No. 197,722.

*To all whom it may concern:*

Be it known that I, IGUMA MORI, citizen of Japan, residing at No. 123 Daini, Sagisu-Cho, Nishinari-Gun, Osaka-Fu, Japan, have invented certain new and useful Improvements in Razors; and do hereby declare the following to be a full, clear, and exact description of the invention, such as will enable others skilled in the art to which it appertains to make and use the same.

The invention relates to the safety razor or ordinary ones and the like, in which an arrangement is made for the purpose of keeping the blade warm by the employment of a heated material during use, and it has for its particular object to make shaving much more comfortable and easy, to save frequent whetting, and to increase the durability of the blade.

*The explanation of drawing.*—Figure 1 is a sectional view of a safety razor, in which a hot water chamber is provided in close touch with the blade in order to transmit heat to the latter according to the principle of the invention. Fig. 2 is a sectional view of the razor in a perpendicular position. Fig. 3 is a plan of the razor with the handle off.

*Detailed description.*—As already stated, the object of the invention being to make shaving more comfortable and easy, and to save the frequent trouble of whetting by means of a special arrangement, by which a suitable degree of heat can be given during use to the edges of the razor of any type and shape, a detailed description will hereinafter be made, taking for an example the case of a safety razor, to which a warming chamber of a suitable design is provided for the purpose of heating the blade as shown in the drawing attached.

A detachable warming chamber (*d*) is placed between the handle (*c*) and the blade (*b*) which is clamped by the blade fixer (*a*). When the razor is to be used, hot water or some other heated material is put into the chamber (*d*) which gradually transmits the heat to the blade (*b*) with which the single bottom wall of the chamber is clamped in immediate contact. To preserve the heat of hot water it is advisable to have the double side and top walls of the chamber or container (*d*) insulated by a space between, or fill up that space with asbestos or the like. Ordinary razors and the like of any type can also be treated with excellent effect in the same manner, viz, with properly designed water heating arrangements to keep the blade warm while in use. It can be ascertained by a simple experiment that when the blade is heated above the temperature of the human body it shaves so finely and comfortably that a downward pare with it is as effectual as an upward pare with an ordinary razor, and that it never irritates the skin, and that frequent whetting becomes quite unnecessary. Even old abandoned razors can be used afresh with good results, if with the aforesaid arrangement.

A heated blade has the natural effect of expanding the part of the skin with which it has come into contact. The expansion of the skin causes the root part of the hair to rise up and expose itself, when the fat, which always stays at the lower end of the hair, and which chiefly impedes the work of the razor on account of its lubricous character, melts away on getting the heat from the blade. A great obstacle to fine shaving is thus overcome, the blade having now a readier and surer grip on hairs, a close and comfortable shaving is made possible.

I do not wish to be limited to the exact construction shown as the same may be altered without departing from the spirit of the invention as expressed in the appended claims.

What I claim is:

1. A razor comprising the combination of a razor blade, and means carried by the razor and associated with said blade for transmitting heat directly to the blade.

2. A razor comprising the combination with a blade, of a container adapted and arranged to carry means for heating said blade, said container having means for resisting radiation of heat therefrom and also having a wall thereof disposed in contact with said blade.

3. A razor comprising the combination of a razor blade and means carried by the razor and disposed in contact with said blade for heating the same.

4. A razor comprising, in combination, a blade, a handle, and a container engaging said blade and disposed between said blade and handle, said container being arranged to inclose heating means and to transmit heat therefrom to said blade.

5. A razor comprising, in combination, a blade, a container having insulated side and top walls and a non-insulated bottom wall, and means for clamping said container against said blade with said bottom wall in contact with said blade.

6. A razor comprising, in combination, a blade, a support for said blade, a handle, a container disposed between said handle and blade, and means whereby one wall of said container is clamped in contact with said blade.

In testimony whereof I hereunto affix my signature.

IGUMA MORI.